Oct. 13, 1925.
A. R. HEADLEY
EGG BEATER
Filed Nov. 4, 1924
1,557,364
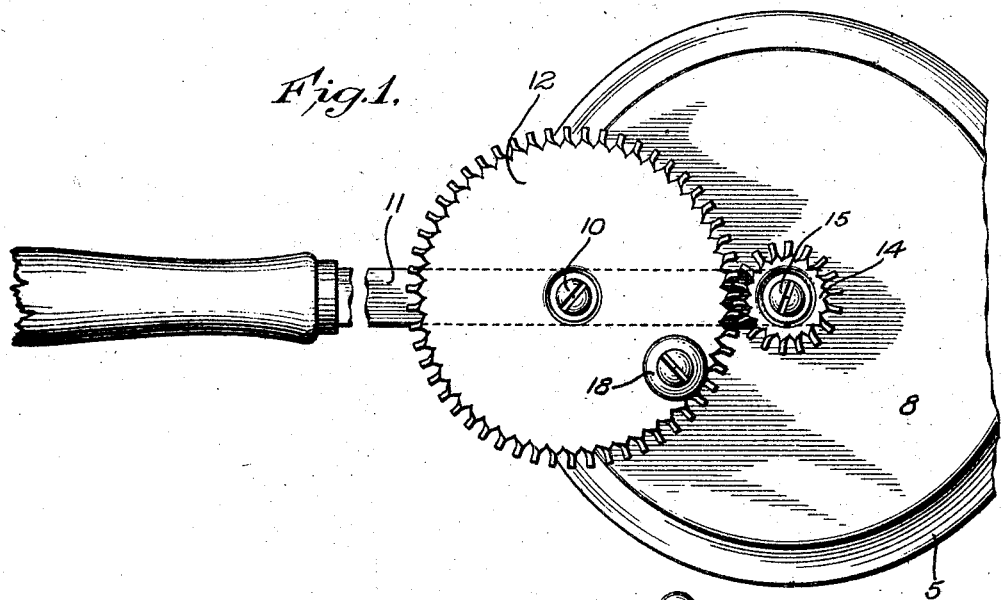
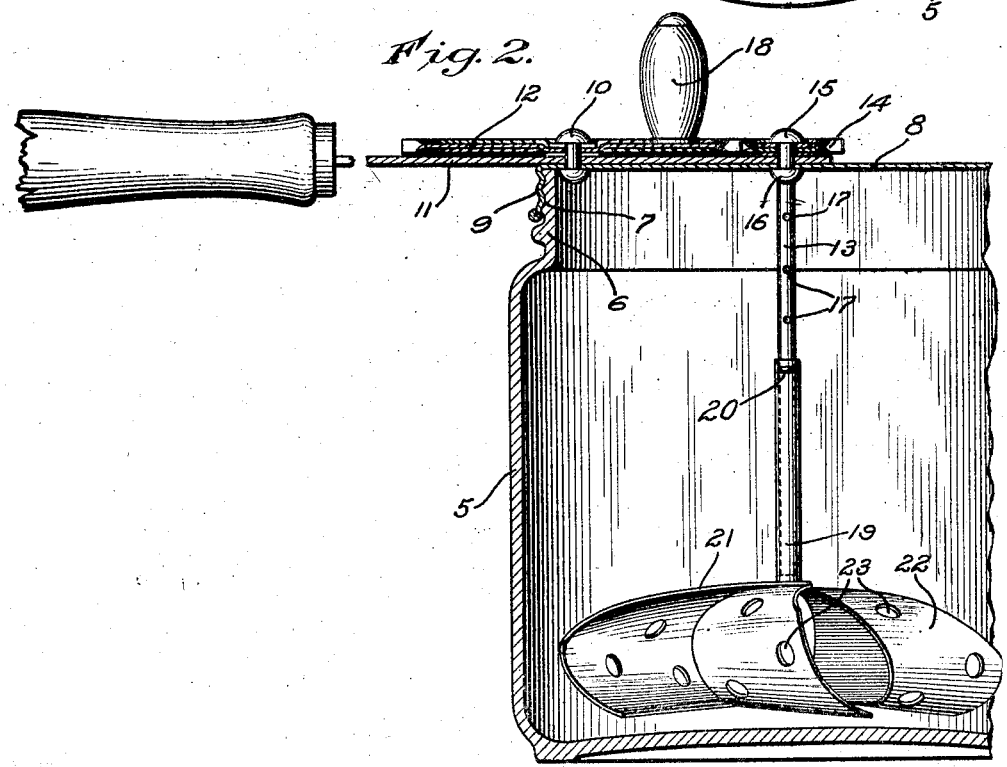
WITNESSES
INVENTOR
AFTON REES HEADLEY
BY
ATTORNEYS Patented Oct. 13, 1925.

1,557,364

UNITED STATES PATENT OFFICE.

AFTON REES HEADLEY, OF MULBERRY, OHIO.

EGG BEATER.

Application filed November 4, 1924. Serial No. 747,862.

*To all whom it may concern:*

Be it known that I, AFTON REES HEADLEY, a citizen of Canada, and a resident of Mulberry, in the county of Clermont and State of Ohio, have invented a new and Improved Egg Beater, of which the following is a full, clear, and exact description.

The present invention relates to new and useful improvements in culinary utensils and the like, and it pertains more particular to a device for beating eggs, cream, etc.

It is one of the primary objects of the present invention to provide a device of this character which is adapted for use in connection with closed jars.

It is a further object of the invention to provide a device of this character in which the beater or agitator is carried by and supported from a removable cover for a closed jar.

It is a further object of the invention to provide a device of this character in which the beater or agitating element is adjustable thereby adapting the device for use in connection with jars of different depths.

With the above and other objects in view, reference is had to the accompanying drawings, in which—

Figure 1 is a fragmentary plan view of a beater constructed in accordance with the present invention;

Fig. 2 is a fragmentary sectional view thereof.

Referring more particularly to the drawings, the reference numeral 5 designates a receptacle in the form of a closed jar or the like, and said receptacle has a neck 6 provided with a screw thread 7. Adapted for engagement with the screw thread 7, there is a cap 8, having a threaded portion 9 receiving the neck 6. Carried by the cap 8 and secured thereto, by means of a rivet 10, there is a handle 11. Mounted on the handle 11, by the same rivet 10, there is a gear wheel 12. The handle 11 is further secured to the cap 8 by a shaft 13, and this shaft also serves to secure the gear 14 to the handle member 11 and the cap 8. The shaft 13 has a head portion 15 thereon and an enlarged portion 16. The lower end of the shaft 13 is provided with a plurality of spaced openings 17, the purpose of which will be hereinafter described. The gear 12 heretofore mentioned is provided with a handle 18, by means of which it is rotated, and such gear 12 meshes with the gear 14 in order to drive the shaft 13.

The reference numeral 19 designates a tubular member which receives the shaft 13, and such tubular member carries a cross pin or the like, 20, adapted to be received in either one of the openings 17 in order to lock the tubular member and the shaft 13 together. Carried by the lower end of the tubular member there is an agitating or beating member 21, and this comprises a plurality of folded wing members 22, perforated as at 23. This agitating or beating element is suitably secured to the tubular member 19 in such a manner that as the tubular member is rotated, the beater or agitating element will likewise be agitated.

In operation, the material to be beaten is placed within the receptacle 5 and upon rotation of the gear 12 by the handle 18, the gear 14 will be rotated, which will serve to drive the shaft 13, and through the medium of the cross pin 20, the tubular shaft or member 19 and the agitating element 21, will be rotated.

What is claimed is:

1. In a beater, a cover for a receptacle, a handle secured to the cover, a plurality of meshing gears carried by the handle, the means for securing the handle to the cover also serving as a mounting for one of the gears, and a beater carrying shaft mounted in the cover and handle and upon which another of the said gears is mounted.

2. In a beater, a cover for a receptacle, a handle secured to the cover, a gear mechanism carried by the cover and handle, a beater carrying shaft mounted in the cover and handle and upon which one of the gears of the said mechanism is mounted, and a handle on one of the gears of said mechanism.

3. In a beater, a cover for a receptacle, a handle secured to and extending partially over the cover, a gear wheel mounted on the handle by the means securing a portion of the handle to the cover and provided with a handle, a second gear wheel meshing with the first gear wheel, and a beater carrying shaft serving to secure another portion of the handle and the second gear wheel on the cover and handle.

AFTON REES HEADLEY.